United States Patent
Nagao et al.

(10) Patent No.: US 6,947,160 B2
(45) Date of Patent: Sep. 20, 2005

(54) NETWORK FACSIMILE APPARATUS AND CHANNEL SELECTING METHOD

(75) Inventors: Mitsutaka Nagao, Utsunomiya (JP); Hideki Uchiyama, Utsunomiya (JP); Yasuhiro Tasaka, Utsunomiya (JP); Youichi Mochizuki, Utsunomiya (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 946 days.

(21) Appl. No.: 09/770,292

(22) Filed: Jan. 29, 2001

(65) Prior Publication Data

US 2002/0051175 A1 May 2, 2002

(30) Foreign Application Priority Data

Jun. 27, 2000 (JP) ........................................ 2000-192448

(51) Int. Cl.⁷ ............................ G06K 1/00; H04N 1/00; H04N 1/41; H04M 11/00
(52) U.S. Cl. ...................... 358/1.15; 358/403; 358/407; 358/426.02; 379/93.01; 379/100.09; 379/100.08
(58) Field of Search ............................... 358/1.15, 1.16, 358/403, 407, 426.02, 400, 505, 453, 468, 500, 524; 379/93.01, 100.09, 100.08, 93.24, 93.02, 93.07, 93.05, 93.23, 93.34, 100.12, 137

(56) References Cited

U.S. PATENT DOCUMENTS

| | | | | |
|---|---|---|---|---|
| 5,719,688 A | * | 2/1998 | Kagami | 358/468 |
| 5,881,233 A | | 3/1999 | Toyoda et al. | |
| 6,094,277 A | * | 7/2000 | Toyoda | 358/1.15 |
| 6,603,569 B1 | * | 8/2003 | Johnson et al. | 358/1.15 |
| 2002/0032736 A1 | * | 3/2002 | Idehara | 709/206 |

FOREIGN PATENT DOCUMENTS

| | | |
|---|---|---|
| EP | 0835021 | 4/1998 |
| EP | 0836315 | 4/1998 |
| JP | 8-242326 | 9/1996 |
| JP | 11-41436 | 2/1999 |
| JP | 11112762 | 4/1999 |
| JP | 2000-49999 | 2/2000 |

* cited by examiner

*Primary Examiner*—Kimberly Williams
*Assistant Examiner*—Thomas J Lett
(74) *Attorney, Agent, or Firm*—Greenblum & Bernstein, P.L.C.

(57) ABSTRACT

The present invention selects a channel to be used in facsimile-transmitting image information included in e-mail subjected to relay request in accordance with channel selection information included in said e-mail.

10 Claims, 9 Drawing Sheets

| CHANNEL CONNECTION NAME | OPTION BOARD ATTACHING SYSTEM (EXCEPTING CH1) | SELECTABLE CHANNEL |
|---|---|---|
| STANDARD | ch2 LAN | OUTSIDE LINE(ch1), INTERNAL LINE(ch2) |
| G3 OP 1ch | ch2 LAN, ch3 G3 | OUTSIDE LINE(ch1 or ch3), INTERNAL LINE, OUTSIDE LINE1(ch1), OUTSIDE LINE3(ch3) |
| G3 OP 2ch | ch2 LAN, ch3/ch4 G3 | OUTSIDE LINE(ch1 or ch3), INTERNAL LINE, OUTSIDE LINE1, OUTSIDE LINE3,OUTSIDE LINE4(ch4) |
| G3+G4 OP | ch2 LAN, ch3 G3, ch4 G4 | OUTSIDE LINE(ch1 or ch3), INTERNAL LINE,OUTSIDE LINE1, OUTSIDE LINE3,G4,G3(ISDN) |
| G4 OP 1ch | ch2 LAN, ch3 G4 | OUTSIDE LINE(ch1), INTERNAL LINE,G4,G3(I) |
| G4 OP 2ch | ch2 LAN, ch3/ch4 G4 | OUTSIDE LINE(ch1), INTERNAL LINE, G4,G3(I),G4(ch3),G3(I,ch3),G4(ch4),G3(I,ch4) |

FIG. 4

| PASSWORD | TYPE OF CHANNEL |
|---|---|
| PSTN | OUTSIDE LINE |
| PSTN 1 | OUTSIDE LINE 1 |
| PSTN 3 | OUTSIDE LINE 3 |
| PSTN 4 | OUTSIDE LINE 4 |
| ISDN G3 | G3(I) |
| ISDN 3 G3 | G3(I, ch3) |
| ISDN 4 G3 | G3(I, ch4) |
| ISDN G4 | G4 |
| ISDN 3 G4 | G4(ch3) |
| ISDN 4 G4 | G4(ch4) |

FIG. 6

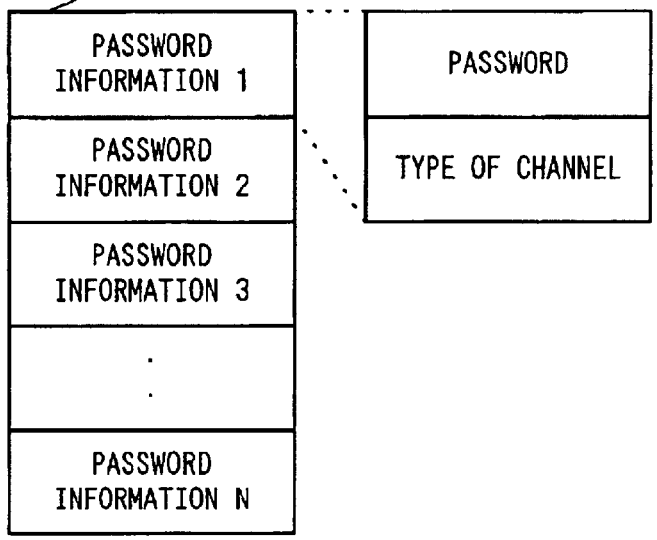
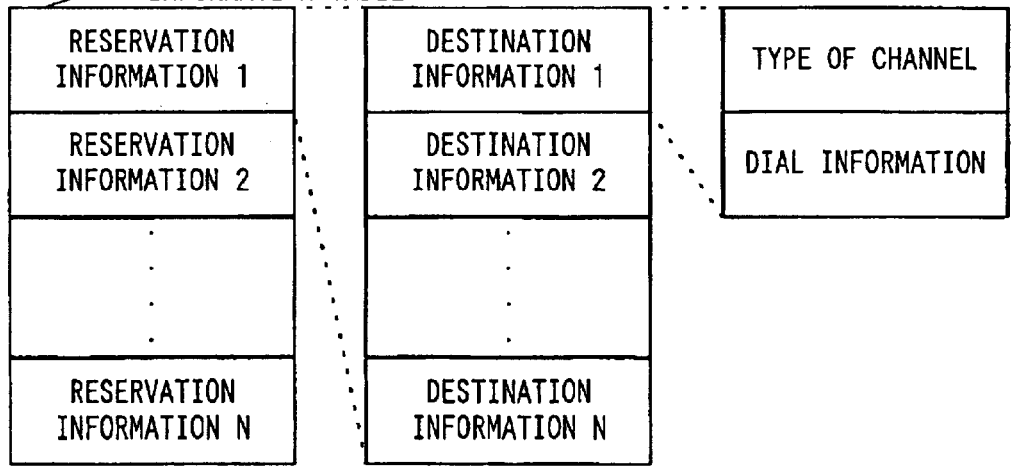
FIG. 7

Fig. 9

RECEIVED MAIL

To:ISDNG3#0334349191@IFAX01.○○.××.co.jp

From:□□.△△.co.jp

Subject:RELAY REQUEST

MESSAGE DATA(TEXT)

ATTACHED FILE DATA

NETWORK FACSIMILE APPARATUS AND CHANNEL SELECTING METHOD

BACKGROUND OF THE INVENTION

1. Field of the Invention

The present invention relates to a network facsimile apparatus connectable to a network such as a LAN and the like and relates to a channel selecting method for a facsimile relay apparatus.

2. Description of the Related Art

Internet facsimile apparatuses (hereinafter referred to as IFAX) are used as a network facsimile apparatus connectable to a network such as a LAN and the like. IFAX is provided with a facsimile communication function and an e-mail communication function. This provision converts image information of e-mail sent from a PC and the like to facsimile data, and can relay and transfer facsimile data to a requested destination.

Moreover, IFAX determines whether e-mail subjected to relay request is sent from an authorized user or a third party by use of a password for relay permission. In a case where IFAX receives e-mail with no password or e-mail with a different password, IFAX is designed such that this e-mail is neither relayed nor transferred.

Furthermore, in IFAXes, there is IFAX to which a plurality of different network channels is connected.

In this kind of IFAX, the type of channel to be used in relaying e-mail must be adjusted to the type of channel, which is used by a facsimile apparatus at an e-mail transfer destination. However, the type of channel, which is used by a facsimile apparatus at an e-mail transfer destination, is not recognized at the IFAX side. Moreover, in the e-mail relay system using the conventional IFAX, IFAX cannot designate the channel to be used in transferring image information of e-mail at the relay request side. For this reason, IFAX side decides one-sidedly the network channel to be used in relaying e-mail. This causes a problem in which IFAX cannot select an appropriate channel, so that transfer of e-mail cannot be carried out.

SUMMARY OF THE INVENTION

It is an object of the present invention is to provide a network facsimile apparatus that can select an appropriate channel to transfer image information of e-mail in transferring image data of e-mail subjected to a relay request, and provide a channel selecting method.

The present invention selects a channel to be used in facsimile-transmitting image information contained in e-mail subjected to a relay request in accordance with channel selection information contained in e-mail subjected to the relay request.

This makes it possible to determine the type of channel based on channel selection information added to e-mail subjected to the relay request even if the facsimile apparatus in which a plurality of the same or different types of channels is usable is employed.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 4 is a view showing the relationship among a channel connection name of IFAX according to the above embodiment, an option board attaching system and a selectable channel;

FIG. 6 is a view showing an example of types of channels and passwords according to the above embodiment;

FIG. 7 is a view showing a configuration of an information storage area according to the above embodiment;

FIG. 9 is a view showing received e-mail according to the above embodiment.

DETAILED DESCRIPTION OF THE PREFERRED EMBODIMENTS

The following will explain an Internet facsimile apparatus to which a network facsimile apparatus according to one embodiment of the present invention is applied.

Figure 1:
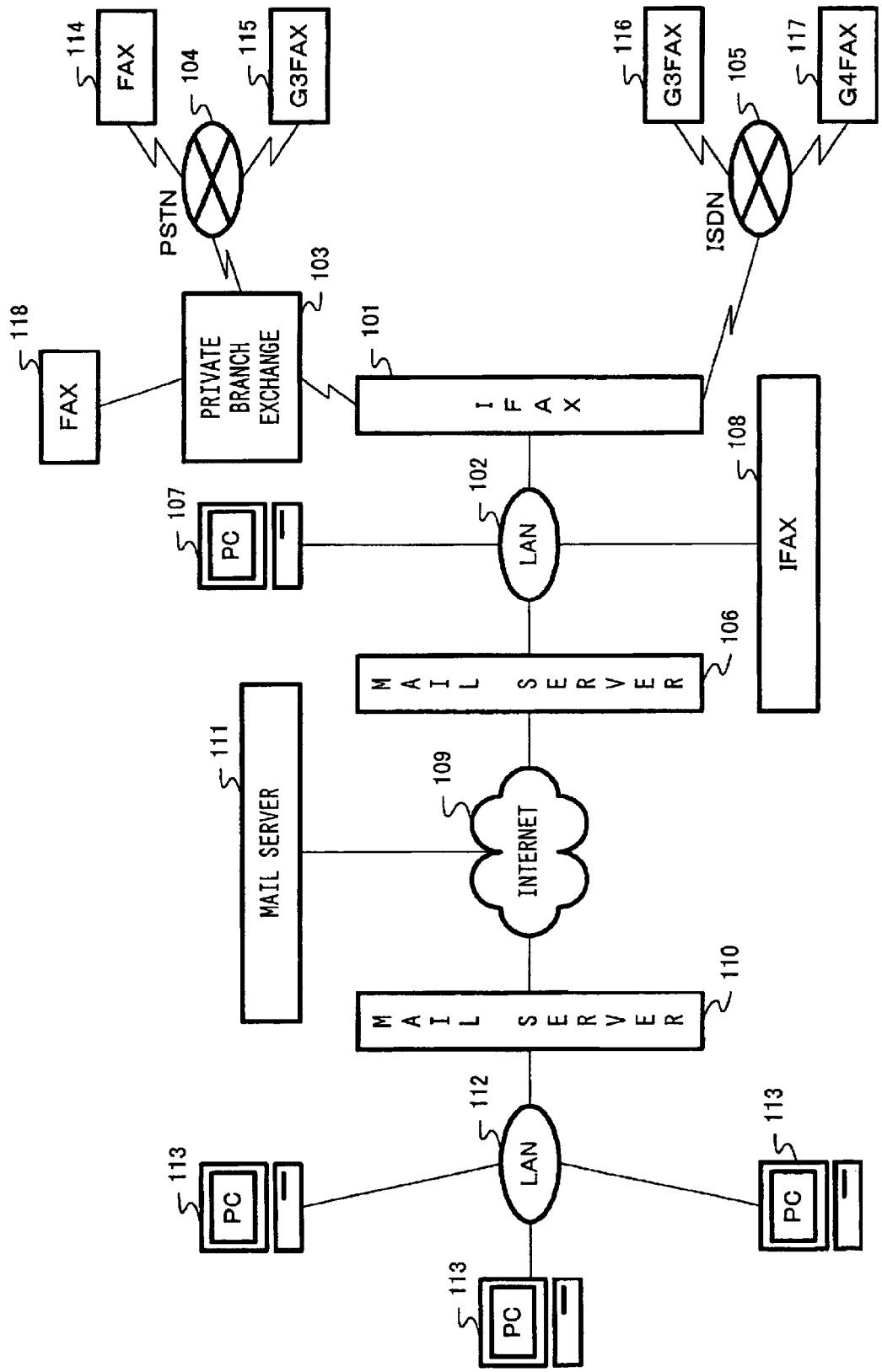
FIG. 1 is a conceptual view showing a network system where an Internet facsimile apparatus according to one embodiment of the present invention operates.

FIG. 1 is a conceptual view showing a network system where an Internet facsimile apparatus according to one embodiment of the present invention operates.

IFAX 101 according to the above embodiment is connected to a public switched telephone network (PSTN) 104 and an integrated services digital network (ISDN) 105 via LAN 102 and private branch exchange 103. PC 107, mail server 106, and other IFAX 108 are connected to LAN 102. Internet 109 is connected to the mail server 106. Also, a plurality of mail servers 110 and 111 are connected to the Internet 109. LAN 112 is connected to the mail server 110. Then, a plurality of PCs 113, which is a request source for relay to IFAX 101, is connected to LAN 112

FAX 114, which performs facsimile communication via PSTN 104, and G3FAX 115, which performs communication based on G3 procedure, are connected to PSTN 104. Furthermore, G3FAX 116, which performs facsimile communication based on G3 procedure via PSTN 105, and G4FAX 117, which performs communication based on G4 procedure, are connected to ISDN 105. Moreover, FAX 118, which performs facsimile communication using an internal line in addition to PSTN 104, is connected to the private branch exchange 103. Thus, IFAX 101 connects a plurality of channels that transfer e-mail.

In this way, with the above-configured relay system, the channel to be used by IFAX 101 is changed to transfer e-mail, whereby making it possible to transfer e-mail to any one of FAXes 114 to 118 connected via a different channel.

In such a relay system, e-mail to which image information is attached in TIFF file format is transferred to IFAX 101, which is the relay apparatus, from PC 113, which is a request source. For example, in a destination field of a header of this e-mail, there is described one in which information, which designates the type of channel to be used in IFAX 101, and dial information of FAXes 114 to 118 are inserted to a mail address of IFAX 101. A relay requester can transmit the fact of whether the transmitted e-mail indicates a relay request or not, dial information of e-mail relay destination, and the type of channel to be used in transferring e-mail to IFAX based on the above e-mail address.

IFAX 101 analyzes this e-mail address, and recognizes the channel to be used and dial information from this e-mail. IFAX 101 also converts a text portion of e-mail to facsimile data. Moreover, IFAX 101 fetches image information from the TIFF file attached to the e-mail, and converts it to a facsimile data file. Thereafter, IFAX 101 transfers facsimile data to FAXes 114 to 118 with recognized FAX numbers using the recognized channel.

In addition, as widely known, the e-mail is transferred to IFAX 101 from PC 113 by mail servers 106 and 110 in accordance with an e-mail transfer protocol.

Figure 2:
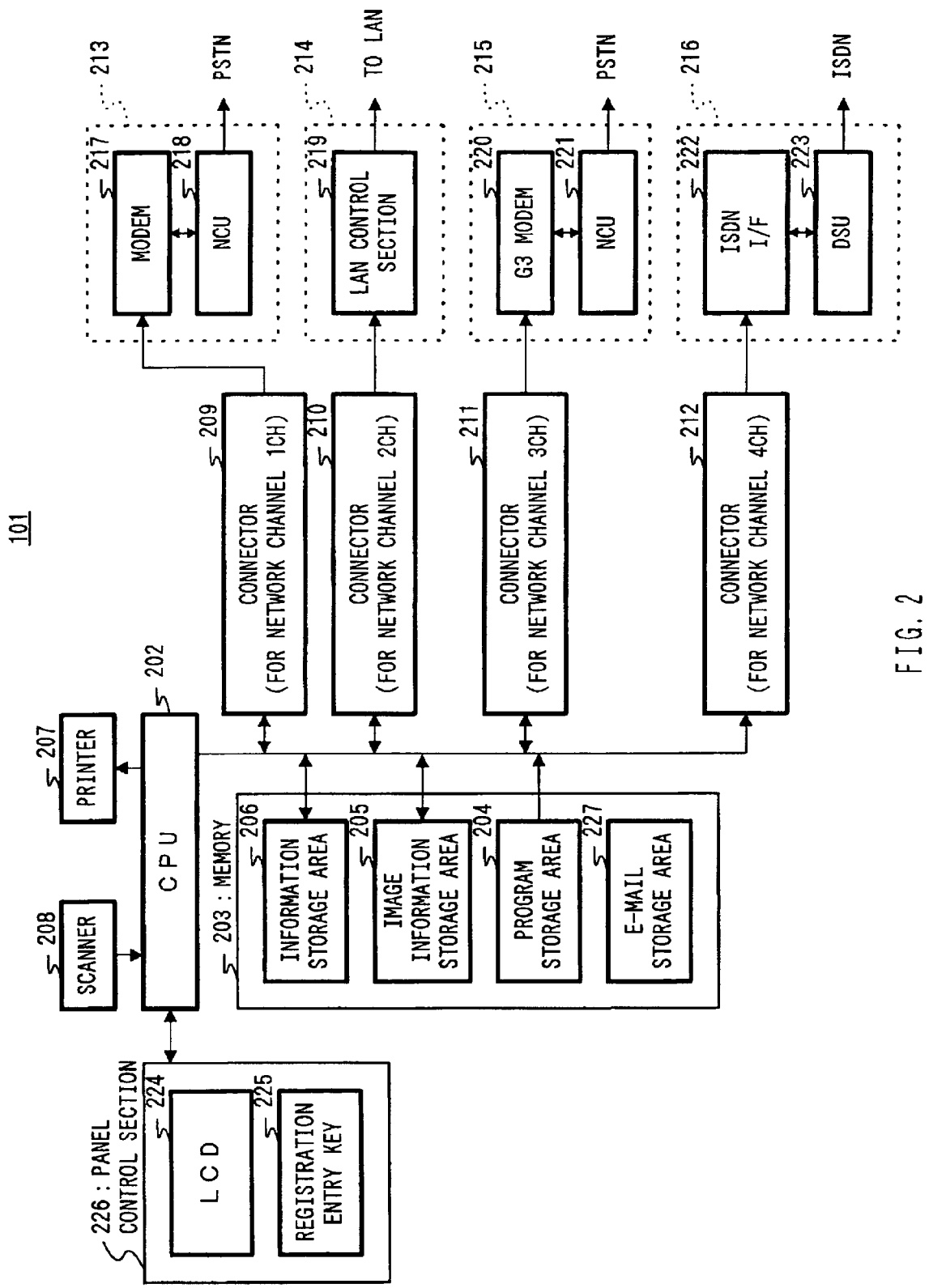
FIG. 2 is a block diagram showing hardware of IFAX according to the above embodiment.

FIG. 2 is a block diagram showing hardware of IFAX according to the above embodiment. IFAX 101 is provided with CPU 202. CPU 202 executes a program stored in memory 203 as storage means, and controls the entirety of apparatus.

Memory 203 comprises program storage area 204, image information storage area 205, information storage area 206, and e-mail storage area 227. The program storage area 204 stores a program executed by CPU 202. Also, the image storage area 205 is an area that stores image information transmitted via communication means or image information to be transmitted via communication means. Moreover, in information storage area 206, information for designating a network channel to be used by IFAX 101 and information on communication are stored. The details on information storage area 206 will be described later. The e-mail storage area 227 is an area that stores received e-mail.

Furthermore, IFAX 101 comprises printer 207, which is printing means for printing image information transmitted via communication means, and scanner 208, which is scanning means for scanning image information to be transmitted via communication means.

Additionally, a plurality of communication means is attached to IFAX 101 in order to execute communication via a plurality of channels. More specifically, IFAX 101 is provided with four network channels of 1ch to 4ch so as to execute communication via the plurality of different channels. A user attaches option boards 213 to 216, which are communication means that perform different communications, to connector 209 to 212 corresponding to the respective network channels, whereby carrying out a plurality of communications using a plurality of different channels (four kinds in this embodiment).

The option board 213, having modem 217 and network control unit (NCU) 218, is attached to the connector 209 for network channel 1ch. The NCU 218 is connected to PSTN 104 via private branch exchange 103. The modem 217 is connected to NCU 218 by use of an analog signal line. The modem 217 modulates and demodulates facsimile data, which is transmitted/received to/from a facsimile apparatus at the other end of communication via PSTN 104. This makes it possible for IFAX 101 using the network channel 1 to perform communication with an internal IFAX or FAX using PSTN 104 via private branch exchange 103.

Moreover, option board 214, having LAN control section 219 as e-mail transmitting/receiving means, is connected to connector 210 for network channel 2ch. LAN control section 219 is connected to LAN 102 via a router (not shown) and the like, and executes procedures necessary for performing data communication with the other information terminals via LAN 102. This allows IFAX 101 to perform communication with PC or the mail server. Namely, by use of network channel 2ch, it follows that IFAX 101 has a function of transmitting/receiving e-mail.

Further, G3 modem 220 for G3 facsimile procedure and option board 215 having NCU 221 are connected to connector 211 for network channel 3ch. This makes it possible for IFAX 101 using the network channel 3ch to perform G3 facsimile communication using PSTN 104.

Furthermore, connector 221 for network channel 4ch is provided with ISDN interface (I/F) 222 and DSU 223. This makes it possible for IFAX 101 using the network channel 4ch to perform communication with other facsimile apparatuses by G4 facsimile communication.

Regarding option boards 213 to 216 to be connected to connectors 209 to 212, the user can arbitrarily select the option board and attach it. This allows IFAX 101 to have the function of performing communication using a desired communication channel. In addition, if any one of option boards 213 to 216 is connected to any one of connectors 209 to 212, IFAX 101 can work.

IFAX 101 is also provided with panel control section 226 having LCD 224, which is means for visually displaying various kinds of information, and registration entry key 225, which is means for inputting various kinds of registering information. The user operates entry key 225 as viewing LCD 224, making it possible to register appropriate information.

An explanation is next given of an operation in which IFAX 101 transmits image information to PC.

IFAX 101 stores image information scanned by scanner 208 into image information storage area 205, and converts the image information to TIFF format, which is a format wherein image management of this image information is performed by PC. Moreover, IFAX 101 converts the converted image data to MIME format, which is a standard for transmitting data other than text by e-mail. After that, IFAX 101 transmits the converted data as e-mail via LAN control section 219. ICP/IP is used as a protocol for transmitting e-mail.

An explanation is next given of an operation serving as a relay apparatus in which IFAX 101 transfers e-mail sent from PC to FAX. IFAX 101 decompresses e-mail, which has been transmitted via LAN control section 219 and stored in image information storage area 205, into a text section and an attached file section.

Then, IFAX 101 converts the text section into a bit map data, and facsimile-transmits the bit map as facsimile data to FAX via modems 210, 211 or ISND I/F 214. And IFAX 101 extracts a MH data from the TIFF-formatted file of the attached file section, and facsimile-transmitted the MH data map as facsimile data to FAX via modems 210, 211 or ISND I/F 214. At this time, a destination for a relay destination is stored in an e-mail destination field [To:], and IFAX 101 detects the destination and originates a call to the destination.

Figure 3:
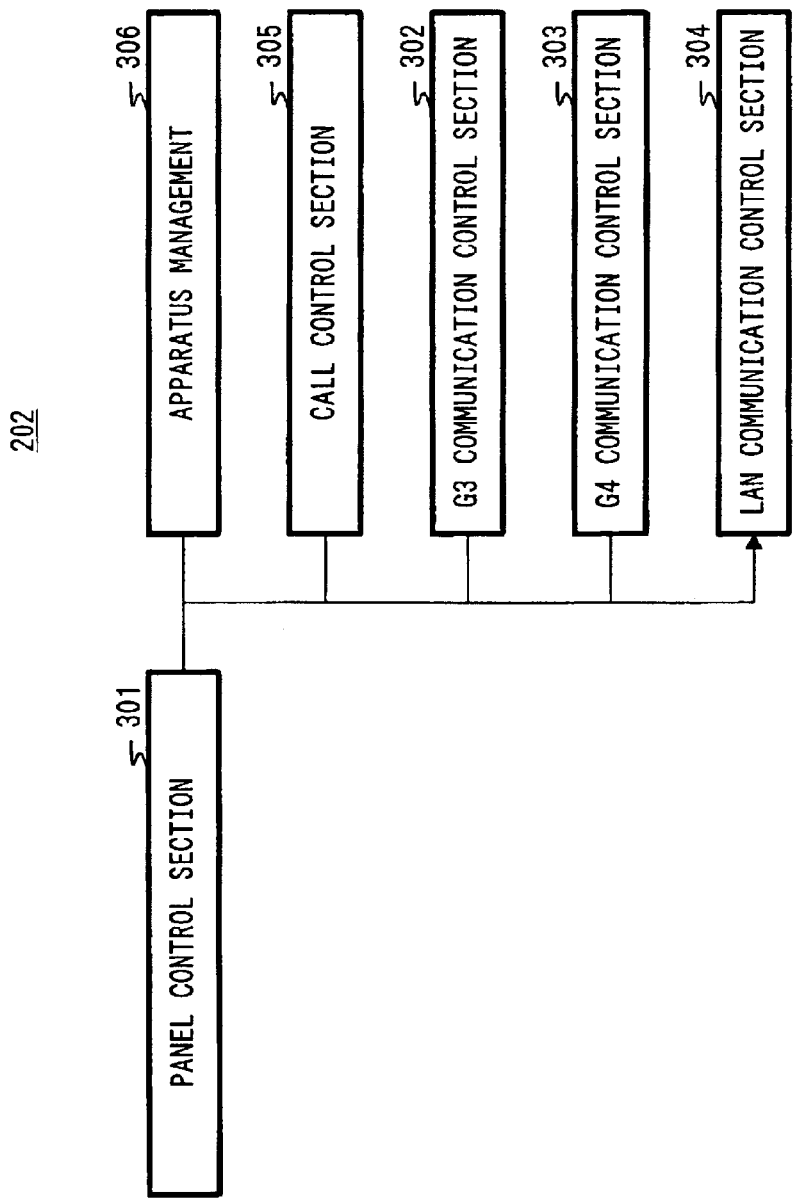
FIG. 3 is a function block diagram of CPU according to the above embodiment.

Next, the following explains a function, which is obtained when CPU 202 executes a program stored in program storage area 204, with reference to FIG. 3. FIG. 3 is a function block diagram of CPU according to the above embodiment.

CPU 202 is provided with a function as panel control section 301 that performs control of panel control section 226 such as control of LCD 224, that of signals input from registration entry key 217, and so on.

CPU 202 also has a function as communication control means. As communication control means, there is provided G3 communication control section 302 that controls modems 217, 220 and NCUs 218, 221 or ISDN I/F 222 and DSU 223 to perform transmission and reception of e-mail by G3 facsimile communication. As communication control means, there is also provided G4 communication control section 303 that controls ISND I/F222 and DSU 223 to perform transmission and reception of e-mail by the G4 facsimile procedure. Moreover, as communication control means, there is also provided LAN communication control section 304 that controls LAN control section 219 to perform transmission and reception of e-mail by LAN communication.

Thus, since CPU 202 operates as a plurality of different kinds of communication control, IFAX 101 can perform a plurality of different kinds of communications.

CPU 202 is provided with call control section 305, which controls G3 communication control section 302 and G4 communication control section 303 to perform changeover as to whether a call is originated using G3 communication procedure or a call is originated using G4 communication procedure. CPU 202 also comprises apparatus management control section 306 that carries out the control of the aforementioned control sections, various kinds of settings, and various kinds of information processing.

In addition, as mentioned above, IFAX 101 switches the channel connection system by changing the option boards 213 to 216 connected to connectors 209 to 212. The following explains the option board attaching systems of IFAX 101 and the selectable channels, which correspond to the option board attaching systems, respectively, with reference to FIG. 4 (in other words, a channel designating system usable by a relay requester). FIG. 4 is a view showing the relationship among a channel connection name of IFAX according to the above embodiment, an option board attaching system and a selectable channel. An option board for performing facsimile communication via PSTN, for example, option board 213 or option board 215 shown in FIG. 2 are attached to connector 209 for network channel ch1 in all connection systems though this is not shown in the figure. Moreover, option board 214, which is connected to LAN 102 and which executes necessary procedure to perform data communication with the other information terminals via LAN 102, is attached to connector 210 for network channel ch2 in all connection systems.

In the case where the channel connection name is "standard", option board 213 or 215 is attached to network channel ch1, and option board 214 is attached to network channel ch2. Such option attaching system makes it possible for IFAX 101 to perform outside-line communication using PSTN from network channel 1ch (outside-line communication via PSTN is hereinafter referred to as outside-line communication) and internal-line communication using LAN from network channel 2ch. whereby, the relay requester can designate which communication IFAX 101 should perform communication using the outside line or communication using the internal line IFAX 101.

In the case where the channel connection name is "G3OP 1ch", option board 213 or 215 is attached to network channel ch1, option board 214 is attached to network channel ch2, and option board 215 is attached to network channel ch3. Such option attaching system makes it possible for IFAX 101 to perform outside-line communication using PSTN from network channel 1ch, internal-line communication using LAN from network channel 2ch and G3 facsimile communication using network channel 3ch. In this case, regarding outside-line communication using either network channel ch1or network channel ch3, internal-line communication, outside-line communication using network channel ch1, and outside-line communication using network channel ch3, the relay requester can designate which of these communications IFAX 101 should perform. (In the case of outside-line communication using either network channel ch1 or network channel ch3, the relay requester does not designate which channel should be used.)

In the case where the channel connection name is "G3OP 2ch", option board 213 or 215 is attached to network channel ch1, option board 214 is attached to network channel ch2, and option board 215 is attached to network channel ch3 and network channel ch4. Such option attaching system makes it possible for IFAX 101 to perform outside-line communication using PSTN from network channel 1ch, internal-line communication using LAN from network channel 2ch and G3 facsimile communication using network channel 3ch and network channel 4ch. In this case, regarding outside-line communication using any one of network channel ch1, network channel ch3, network channel ch4, internal-line communication, outside-line communication using network channel ch1, and outside-line communication using network channel ch3 or network channel ch4, the relay requester can designate which of these communications IFAX 101 should perform. (In the case of outside-line communication using any one of network channel ch1, network channel ch3, network channel ch4, the relay requester does not designate which channel should be used.)

In the case where the channel connection name is "G3+G4 OP", option board 213 or 215 is attached to network channel ch1, option board 214 is attached to network channel ch2, option board 215 is attached to network channel ch3, and option board 216 is attached to network channel ch4. Such option attaching system makes it possible for IFAX 101 to perform outside-line communication using PSTN from network channel 1ch, internal-line communication using LAN from network channel 2ch and G3 facsimile communication using network channel 3ch, and G4 facsimile communication using network channel 4ch. In this case, regarding outside-line communication using any one of network channel ch1, network channel ch3, network channel ch4, internal-line communication, outside-line communication using network channel ch1, outside-line communication using network channel ch3, G4 facsimile communication using network channel ch4 and G3 facsimile communication using ISDN, the relay requester can designate which of these communications IFAX 101 should perform. (In the case of outside-line communication using any one of network channel ch1, network channel ch3, network channel ch4, the relay requester does not designate which channel should be used.)

In the case where the channel connection name is "G4OP 1ch", option board 213 or 215 is attached to network channel ch1, option board 214 is attached to network channel ch2, and option board 216 is attached to network channel ch3. Such option attaching system makes it possible for IFAX 101 to perform outside-line communication using PSTN from network channel 1ch, internal-line communication using LAN from network channel 2ch and G4 facsimile communication using network channel 3ch. In this case, regarding outside-line communication using network channel ch1, internal-line communication, G4 facsimile communication using network channel ch3 and G3 facsimile communication using ISDN, the relay requester can designate which of these communications IFAX 101 should perform.

In the case where the channel connection name is "G4OP 2ch", option board 213 or 215 is attached to network channel ch1, option board 214 is attached to network channel ch2, and option board 216 is attached to network channel ch3 and network channel ch4. Such option attaching system makes it possible for IFAX 101 to perform outside-line communication using PSTN from network channel 1ch, internal-line communication using LAN from network channel 2ch and G4 facsimile communication using network channel 3ch or network channel 4ch. In this case, regarding outside-line communication using network channel ch1, internal-line communication, G4 facsimile communication using network channel ch3 or network channel ch4, G3 facsimile communication using network channel ch3 or network channel ch4 via ISDN, G4 facsimile communication using network channel ch3, G3 facsimile communication using ISDN, G4 facsimile communication using network channel ch4, G3 facsimile communication using ISDN, the relay requester can designate which of these communications IFAX 101 should perform. In the case of G4 facsimile communication using network channel ch3 or network channel ch4, the relay requester does not designate which channel should be used. Also, in the case of G3 facsimile communication using network channel ch3 or network channel ch4 via ISDN, the relay requester does not designate which channel should be used.

Thus, IFAX 101 can select the network channel through which the outside-line communication is performed by changing the option board attached to each network channel. This makes it possible for IFAX 101 to select an appropriate channel in accordance with FAX communication mode of the communication partner and to perform communication. Moreover, IFAX 101 can connect the communication network of the same mode to the plurality of network channels. Whereby, the network channel to be used is appropriately changed in accordance with congestion state of the communication channels, preventing the congestion of one network channel caused when communication concentrates on one network channel.

As mentioned above, IFAX 101 can execute communication using a plurality of channels. For this reason, IFAX 101 must recognize which channel should be used to perform e-mail communication. However, since only the relay requester can recognize which communication channel should be used to transfer transmitted e-mail to the other FAX, IFAX 101 cannot recognize it. It follows from the above reason that IFAX 101 can select the channel to be used based on channel selection information from the relay requester. Since the channel to be used can be optionally set by the user, it is needed that this channel selection information be optionally set by the user.

Conventionally, IFAX determines whether e-mail subjected to relay request is sent from an authorized user or a third party using a password for relay permission. For this reason, IFAX is conventionally provided with a function of storing passwords.

The present IFAX 101 stores a pair of password and using channel corresponding to the password, and uses the password as channel selection information. Then, the relay requester transmits e-mail to which this new password is added to IFAX 101. This makes it possible for the relay requester to designate a channel to be used by IFAX 101. In addition, since information, which has been conventionally used as a password, is employed as channel selection information, there is no need to generate new information and to attach the new information to e-mail.

By the way, a plurality of channels is connectable to IFAX 101. For this reason, IFAX 101 requires registering a plurality of passwords in accordance with the number of channels connected to IFAX 101.

Figure 5:
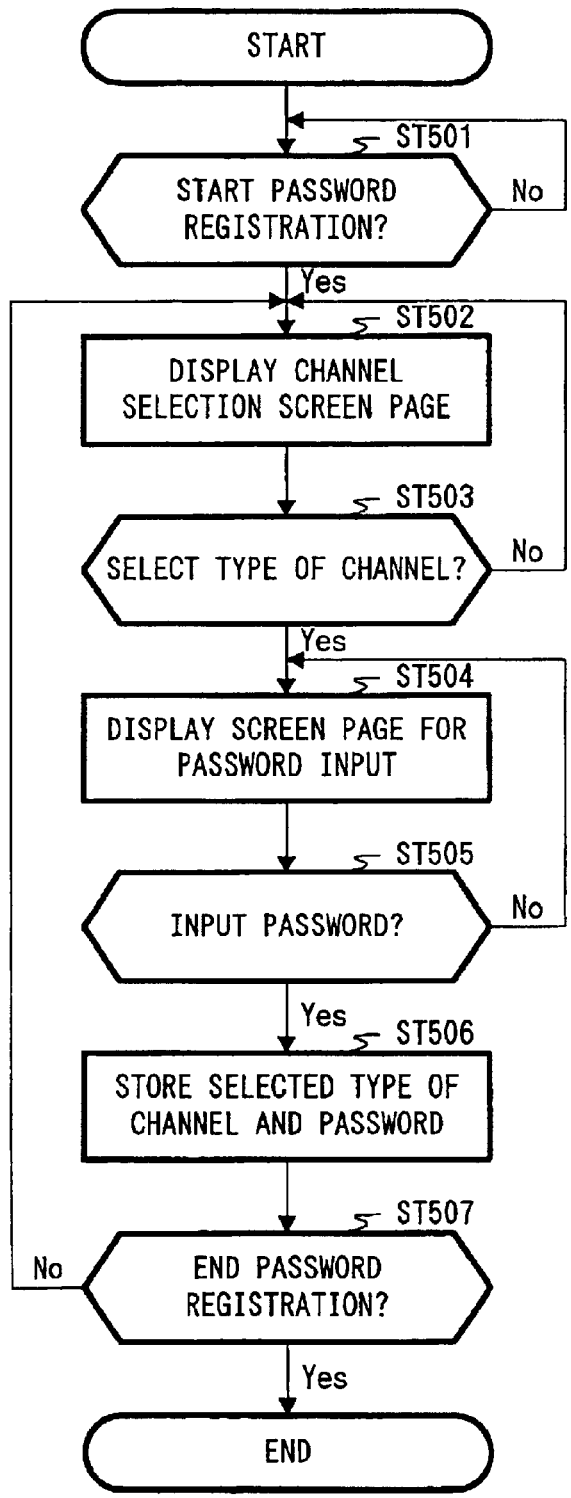
FIG. 5 is an operation flowchart at a password registering time of IFAX according to the above embodiment.

The following explains an operation of IFAX 101 at a password registering time with reference to FIG. 5.

First, IFAX 101 checks panel control section 226 to determine whether there is an instruction for starting a password registration (ST501). In ST501, when IFAX 101 determines that there is an instruction for starting a password registration, IFAX 101 displays a channel selection screen page on LCD 224 (ST502). On the channel selection screen page, information on the channel connection name, option board attaching system and selectable channel as shown in FIG. 4 are displayed. Since this makes it possible to recognize the type of channel, which the user can easily select, the user can easily select the type of channel.

Sequentially, IFAX 101 checks an input signal from registration entry key 225 and determines whether or not the user selects the type of channel (ST503). Then, IFAX 101 repeats processing of ST502 and ST503 until the user selects the type of channel.

After that, when the type of channel is inputted to IFAX 101, IFAX 101 displays the screen page for inputting the password with respect to the type of channel selected by the user on LCD 224 (ST504). Here, FIG. 6 shows an example of the type of channel and password. As shown in FIG. 6, as in the case the type of channel can be imaged from the password, the registration of password allows the password corresponding to the type of channel to be easily selected and input when the user transfers e-mail.

Next, IFAX 101 determines whether the password is inputted or not (ST505). When the password is inputted in IFAX 101 in ST505, IFAX 101 stores the selected type of channel and the inputted password to information storage area 206 (ST506). Next, IFAX 101 display a confirmation as to whether the entry of all passwords is finished. Then, IFAX 101 checks the signal inputted from the registration entry key 225 to determine whether there is an input, which indicates that the password registration is finished, from the user (ST507).

Sequentially, when IFAX 101 detects the signal, which indicates that the password registration is finished, IFAX 101 ends password registration processing. On the other hand, when IFAX 101 detects a signal, which indicates that the password registration is continued, IFAX 101 goes back to processing of ST502 and executes processing of ST502 to 507 until all password registration processing is finished.

As explained above, IFAX 101 makes it possible for the user to arbitrarily register the password, which is channel selection information, every channel optionally connected by the user. Whereby, even if the channel connected by the user is changed, the password can be optionally registered in accordance with the new channel. Consequently, IFAX 101 can set the password with respect to all channel connection patterns.

Moreover, the password thus registered the type of channel associating with the password are stored in password storage section 701 of information storage area 206 as password information as shown in FIG. 7. FIG. 7 is a view showing a configuration of the information storage area according to the above embodiment.

IFAX 101 analyzes the transmitted e-mail and verifies the analyzed result against information of password storage section 701. This makes it possible for IFAX 101 to appropriately select the type of channel according to the password and to transfer e-mail to the selected channel.

The type of channel obtained by analyzing the password of e-mail and dial information of e-mail transfer destination, serving as communication reservation information, are stored to communication reservation information table 702 of information storage section 206 every destination information and every e-mail destination. In this way, the type of channel associating with the password is also stored in communication reservation information table 702. This eliminates IFAX 101 having to analyze the password to transfer at an e-mail transferring time. As a result, transfer processing rate of IFAX 101 is increased at the e-mail transferring time.

Moreover, communication reservation information table 702 can store a plurality of destination information. This makes it possible to automatically send single e-mail to the plurality of destinations by one user's operation.

Figure 8:
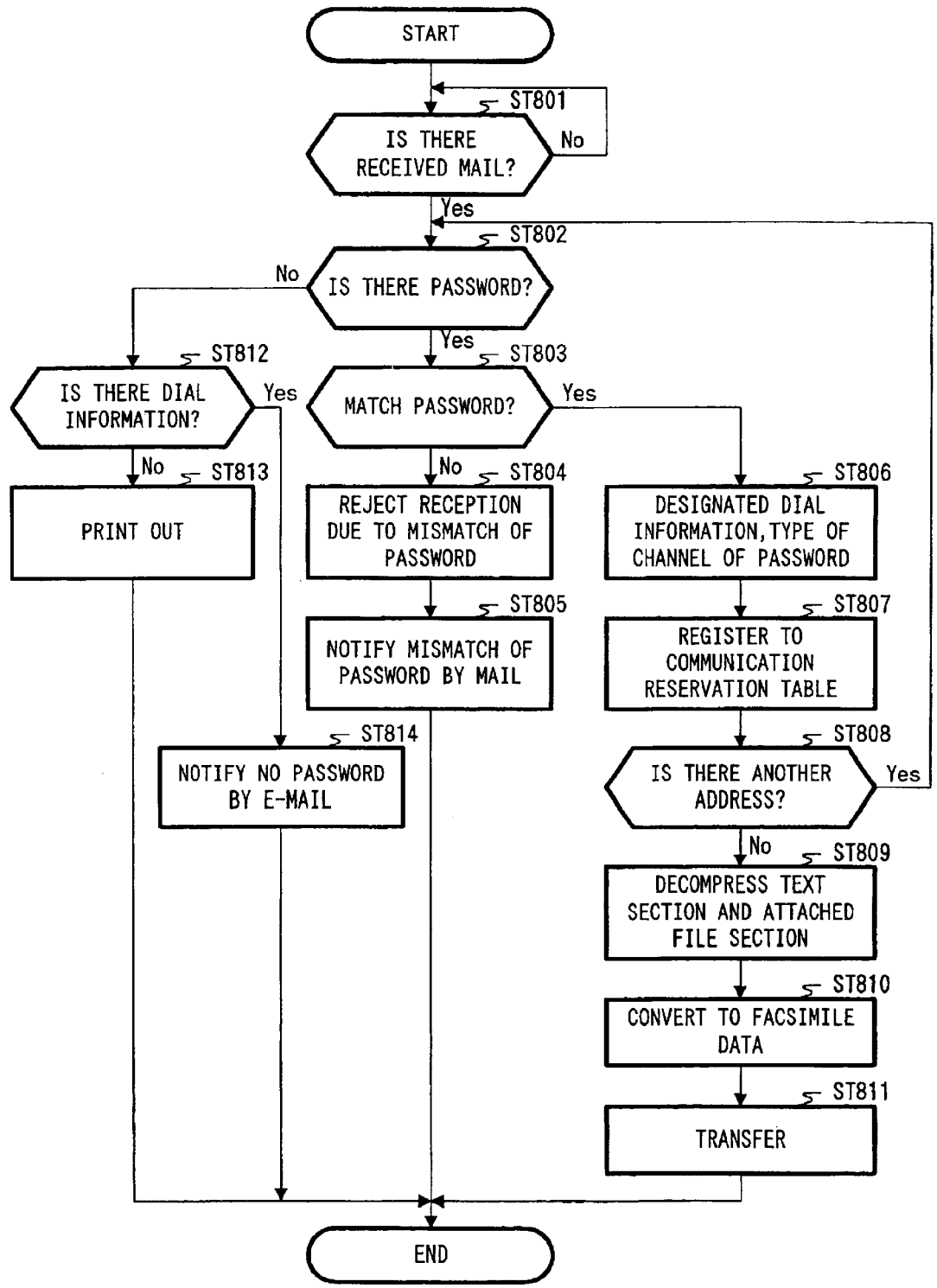
FIG. 8 is a flowchart of an e-mail transfer operation of IFAX according to the above embodiment.

An e-mail transfer operation of IFAX 101 is specifically explained using FIG. 8. FIG. 8 is a flowchart of the e-mail transfer operation of IFAX according to the above embodiment.

First, mail server 106 shown in FIG. 1 analyzes the destination field [To:] of the header section of the e-mail sent from the other mail server. It is assumed that this e-mail is addressed to IFAX 101. In the [To:] portion of e-mail, there is described one in which the password including information on the type of channel to be used and a FAX number of transfer destination are inserted to information indicative of e-mail addressed to IFAX 101. For example, in the [To:] portion of the header section, there is described one in which ISDNG3 that is the password including information on the type of channel to be used and fax number, 0334349191, of the transfer destination are inserted to "@IFAX01. ○○.xx.co.jp, which is an e-mail address of information indicative of e-mail addressed to IFAX 101. The mail server 106 analyzes the [To:] portion of e-mail and checks whether or not e-mail sent from the other mail server is e-mail addressed to IFAX 101, thereby determining as to whether e-mail should be transmitted to IFAX 101.

Thus, even in a mode in which a plurality of IFAXes are connected to mail server 106, the mail server can transmit e-mail to appropriate IFAX by describing information indicative of e-mail addressed to IFAX 101 on the [TO:] portion of e-mail.

Then, IFAX 101 receives e-mail transmitted from mail server 106 shown in FIG. 1 (ST801). In ST801, when IFAX 101 receives e-mail, IFAX 101 stores the received e-mail to e-mail storage area 227 of the memory 203. Then, IFAX 101 analyzes the [To:] portion of the e-mail stored in the e-mail storage area 227, extracts a password (ISDNG3 in the example of FIG. 9) designating the type of channel for e-mail relay transfer, and determines whether or not there is the password in the e-mail received by IFAX 101 (ST802).

Then, when IFAX 101 determines that there is the password in the e-mail received by IFAX 101 in ST802, IFAX 101 determines whether or not the extracted password is stored in password storage section 701 (ST803).

After that, in ST803, when IFAX 101 determines that there is no password of e-mail received by IFAX 101 in password storage section 701, IFAX 101 executes processing for rejecting reception of e-mail due to a mismatch of password (ST804), and provides notification, in which e-mail subjected to relay request cannot be transferred due to the mismatch of password, to the relay request destination (ST805)

This makes it possible for the relay requester to recognize that no e-mail can be transferred since the password is improper. Therefore, after the relay requester carries out a reaffirmation of password and the like to input a proper password, the relay requester can execute the relay request of e-mail again.

On the other hand, when IFAX 101 determines that there is the password of e-mail received by IFAX 101 in password storage section 701 in ST803, IFAX 101 analyzes the [To:] portion of e-mail to perform analysis on dial information of the transfer destination (0334341919 in the example of FIG. 9), while detects the type of channel with reference to password storage section 701 (ST806). Then, IFAX 101 registers the dial information and the type of channel obtained in ST806 to the communication reservation table (ST807).

Next, IFAX 101 checks whether or not there is another address in the received e-mail (ST808), and provides processing of ST802 and afterward to all addresses. Then, when processing of ST802 and afterward to all addresses is ended, IFAX 101 decompresses the received e-mail into a text section and a TIFF file section (ST809). After that, IFAX 101 uses the text section as a bitmap and extracts MH data of image information from a TIFF-formatted file of an attached file section, thereby converting e-mail data to facsimile data (ST810). Then, IFAX 101 transfers the facsimile data to FAX that has dial information registered in the communication reservation table (ST811).

In this way, it is possible to transfer image information of e-mail to the other FAX using the channel designated by the relay requester.

Additionally, when IFAX 101 determines that there is no password in the received e-mail in ST802, IFAX 101 analyzes whether or not there is dial information in this e-mail (ST812). When IFAX 101 determines that there is no dial information in the received e-mail in ST812, it is possible to determine that this e-mail is not e-mail subjected to relay request but FAX addressed to IFAX 101. Then, IFAX 101 prints out image information of this e-mail using printer 207 (ST813). On the other hand, when IFAX 101 determines that there is dial information in the received e-mail in ST812, it is possible to determine that this e-mail is not appropriate. Then, IFAX 101 provides notification, in which this e-mail cannot be transferred since there is no password, to the relay request (ST814), and ends processing.

Thus, IFAX 101 can determine whether received e-mail is e-mail subjected to relay request or e-mail addressed to IFAX 101 without fail. Then, in the case of received e-mail is one addressed to IFAX 101, IFAX 101 can execute processing appropriately by carrying out printout.

As explained above, according to the above embodiment, since the type of channel to be used can be determined by analyzing the password added to the e-mail subjected to relay request even in the network facsimile apparatus having a plurality of channels, it is possible to transmit image information of e-mail using an appropriate channel.

Moreover, according to the above embodiment, since facsimile can connect PSTN and ISDN, it is possible to perform facsimile communication with respect to all kinds of facsimiles including G1 facsimile to G4 facsimile. Therefore, image information of e-mail can be transmitted to all kinds of facsimile apparatuses.

In addition, the above embodiment explains the case in which connection among four channels can be established, but the number of channels is not limited four, and any mode is possible if a plurality of channel is connected.

As explained above, according to the present invention, it is possible to select the channel to be used in facsimile-transmitting image information included in e-mail subjected to relay request in accordance with channel selection information included in e-mail subjected to relay request. Accordingly, it is possible to select an appropriate channel and to transfer e-mail at the time of transferring e-mail subjected to relay request.

The present invention is not limited to the above described embodiments, and various variations and modifications may be possible without departing from the scope of the present invention.

This application is based on the Japanese Patent Application No. 2000-192448 filed on Jun. 27, 2000, entire content of which is expressly incorporated by reference herein.

What is claimed is:

1. A facsimile apparatus comprising:
a facsimile communication section which has a plurality of network channels to be used in facsimile communication;
an e-mail communication section which transmits/receives e-mail;
a channel selection information table which stores a plurality of said network channels and channel selection information corresponding to each of the plurality of said network channels; and
a channel selecting section which specifies said network channel to be used with reference to said channel selection information table based on said channel selection information, when an e-mail, which includes said channel selection information and dialing information of a transmission destination, is received,
wherein said facsimile communication section uses said specified network channel to transmit image information of said received e-mail to a transmission destination designated by said dialing information by facsimile,
wherein, when said channel selection information table has no channel selection information extracted from said received e-mail, said apparatus provides a notification, indicating that said channel selection information is improper, to a sender of said received e-mail.

2. A facsimile apparatus comprising:
a facsimile communication section which has a plurality of network channels to be used in facsimile communication;
an e-mail communication section which transmits/receives e-mail;
a channel selection information table which stores a plurality of said network channels and channel selection information corresponding to each of the plurality of said network channels; and
a channel selecting section which specifies said network channel to be used with reference to said channel selection information table based on said channel selection information, when an e-mail, which includes said channel selection information and dialing information of a transmission destination, is received,
wherein said facsimile communication section uses said specified network channel to transmit image information of said received e-mail to a transmission destination designated by said dialing information by facsimile,
wherein when neither said channel selection information nor said dialing information is in said received e-mail, said facsimile apparatus prints information of said received e-mail.

3. A facsimile apparatus comprising:
a facsimile communication section which has a plurality of network channels to be used in facsimile communication;
an e-mail communication section which transmits/receives e-mail;
a channel selection information table which stores a plurality of said network channels and channel selection information corresponding to each of the plurality of said network channels; and
a channel selecting section which specifies said network channel to be used with reference to said channel selection information table based on said channel selection information, when an e-mail, which includes said channel selection information and dialing information of a transmission destination, is received,
wherein said facsimile communication section uses said specified network channel to transmit image information of said received e-mail to a transmission destination designated by said dialing information by facsimile,
wherein a content of said channel selection information table is updated by information input from a panel control section.

4. A facsimile apparatus having a plurality of communication channels, at least one of the communication channels being connected to a LAN, the facsimile apparatus comprising:
a controller configured to detect receipt of an e-mail, to which image data is attached, via at least the communication channel connected to the LAN, the e-mail including a predetermined password, the predetermined password indicating relay of the attached image data to another facsimile apparatus, the predetermined password further indicating a communication channel to be utilized for relay of the attached image data to the another facsimile apparatus; and
the controller, when the received e-mail includes the predetermined password, being further configured to select, based on the predetermined password, a communication channel for relay of the attached image data to the another facsimile apparatus, to convert the attached image data into facsimile data, and to relay the converted facsimile data to the another facsimile apparatus via the selected communication channel, based on the predetermined password.

5. The facsimile apparatus according to claim 4, further comprising a table configured to store, for each of a plurality of passwords, information indicating a communication channel for relay of the attached image data to the another facsimile apparatus, wherein, when the received e-mail includes the predetermined password, the controller searches the table for information corresponding to the predetermined password, and selects the communication channel for relay of the attached image data to the another facsimile apparatus, based on the corresponding information.

6. The facsimile apparatus according to claim 5, wherein when the table does not contain information corresponding to the predetermined password, the controller transmits an e-mail to a transmitter of the received e-mail, the e-mail notifying the transmitter that the predetermined password indicates an improper communication channel for relay of the attached image data to the another facsimile apparatus.

7. The facsimile apparatus according to claim 4, further comprising a panel configured to input information indicating a communication channel for relay of the attached image data to the another facsimile apparatus, whereby the table is capable of being updated regarding the information indicating a communication channel for relay of the attached image data to the another facsimile apparatus, by the panel.

8. The facsimile apparatus according to claim 4, wherein another one of the plurality of communication channels is configured to be connected to one of a PSTN and an ISDN.

9. The facsimile apparatus according to claim 4, wherein the password is included in a header of the received e-mail.

10. A channel selecting method in a facsimile apparatus, the facsimile apparatus having a plurality of communication channels, at least one of the communication channels being connected to a LAN, the channel selecting method comprising:

receiving an e-mail, to which image data is attached, via the communication channel connected to the LAN, the e-mail including a predetermined password, the predetermined password indicating relay of the attached image data to another facsimile apparatus, the predetermined password further indicating which communication channel is to be utilized for relaying the attached image data to the another facsimile apparatus;

selecting a communication channel for relay of the attached image data to another facsimile apparatus, based on the predetermined password;

converting the attached image data into facsimile data; and relaying the converted facsimile data to the another facsimile apparatus via the selected communication channel, based on the predetermined password.

\* \* \* \* \*